United States Patent Office 3,721,660
Patented Mar. 20, 1973

3,721,660
MOLECULAR SIZING TECHNIQUE FOR PREPARING LOW MOLECULAR WEIGHT COPOLYMERS OF ISOBUTYLENE AN CONJUGATED POLYENES
Jerome Robert Olechowski, Trenton, N.J., assignor to Cities Service Company, New York, N.Y.
No Drawing. Filed May 28, 1971, Ser. No. 148,243
Int. Cl. C08d 5/00; C08f 1/88
U.S. Cl. 260—85.3 R  24 Claims

ABSTRACT OF THE DISCLOSURE

Low molecular weight butyl-type copolymers having narrow molecular weight distributions are prepared by contacting a higher molecular weight butyl-type copolymer, e.g., a butyl rubber, with a catalyst composition comprising a transition metal salt, an organometallic compound of a metal of Group I-A, II-A, II-B, or III-A of the Periodic Table, a proton donor, and an alkene. The catalyst composition preferably comprises a halide of tungsten, molybdenum, or rhenium, an alkyl aluminum halide, a lower alkanol, and an alkene containing 2-4 carbon atoms.

BACKGROUND OF THE INVENTION

Field of the invention

This invention relates to low molecular weight butyl-type copolymers having narrow molecular weight distributions and more particularly relates to a process for preparing such copolymers by the molecular sizing of higher molecular weight butyl-type copolymers, such as butyl-type rubbers.

Description of the prior art

As disclosed in copending application Ser. No. 139,255, filed Apr. 30, 1971, in the name of Jerome Robert Olechowski, low molecular weight butyl-type copolymers useful in sealants, coatings, electrical encapsulants, blends, and binders and as intermediates for the production of low molecular weight chlorobutyl-type copolymers may be prepared by the molecular sizing of butyl-type rubbers with a catalyst composition comprising a transition metal salt, an organometallic compound of a Group I-A, II-A, II-B, or III-A metal, and a proton donor. The products of this process are generally satisfactory but have broader molecular weight distributions than are desirable for some applications. For example, these products typically have weight average molecular weight/number average molecular weight ratios ($M_w/M_n$) higher than 5, whereas it is frequently desirable that the copolymers have $M_w/M_n$ ratios lower than 4.

SUMMARY OF THE INVENTION

The primary object of this invention is to prepare low molecular weight butyl-type copolymers having narrow molecular weight distributions from higher molecular weight butyl-type copolymers.

This and other objects are attained by contacting an isobutylene-conjugated polyene copolymer having a combined polyene content of about 1–5 mol percent with a catalyst composition comprising (1) a transition metal salt, (2) an organometallic compound of a metal of Group I-A, II-A, II-B, or III-A of the Periodic Table, (3) a proton donor selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl, and (4) an alkene.

DESCRIPTION OF THE PREFERRED EMBODIMENTS

As indicated above, the butyl-type copolymer which is treated in accordance with the present invention may be any isobutylene-conjugated polyene copolymer having a combined polyene content of about 1–5 mol percent. The combined polyene units may be derived from any conjugated polyene monomers containing at least four carbon atoms and at least two ethylenic double bonds. Ordinarily, however, the units are derived from one or more aliphatic or cycloaliphatic monomers containing 4–18 carbon atoms and 2–4 conjugated double bonds e.g., butadiene, isoprene, piperylene, 2,3-dimethylbutadiene, cyclooctadiene, cyclododecatriene, cyclohexadecatetraene, etc. The copolymers having a content of about 1–3 mol percent of a combined aliphatic conjugated diene containing 4–6 carbon atoms, especially isoprene, are preferred.

Although the copolymer may be a low molecular weight copolymer having a broad molecular weight distribution, e.g., a copolymer prepared by the process of the aforementioned copending application or a copolymer prepared by thermal scission of a butyl-type rubber, it is preferably a butyl-type rubber, i.e., a copolymer having a viscosity average molecular weight of about 300,000–500,000. However, the product is a copolymer having a lower molecular weight than the starting material and a narrow molecular weight distribution, regardless of whether the starting material has a high or low molecular weight or a broad or narrow molecular weight distribution.

The transition metal salt employed as a component of the catalyst system may be one or more salts of a transition metal such as lanthanum, titanium, zirconium, hafnium, vanadium, niobium, tantalum, chromium, molybdenum, tungsten, manganese, rhenium, ruthenium, osmium, rhodium, iridium, or palladium. Preferably the salt is a halide, more preferably a chloride, but other salts such as the oxyhalides, sulfates, nitrates, phosphates, acetates, propionates, benzoates, acetylacetonates, etc. are also utilizable.

Exemplary of such salts are lanthanum trichloride, titanium tetrachloride, titanium trichloride, zirconium trichloride, hafnium tetrachloride, vanadium oxytrichloride, niobium pentabromide, tantalum pentaiodide, chromic chloride, molybdenum pentachloride, molybdenum pentafluoride, molybdenum hexabromide, molybdenum dichloride, molybdenum oxytetrachloride, molybdenum nitrate, molybdenum acetate, molybdenum propionate, molybdenum benzoate, molybdenum acetylacetonate, molybdenum sulfate, molybdenum phosphate, tungsten hexachloride, tungsten dichloride, tungsten pentabromide, tungsten hexafluoride, tungsten oxytetrachloride, tungsten sulfate, manganese trichloride, rhenium heptachloride, rhenium hexachloride, rhenium hexafluoride, rhenium pentachloride, ruthenium sesquichloride, osmium tetrachloride, rhodium sesquichloride, iridic chloride, palladous iodide, etc.

The preferred salts are the halides of tungsten, molybdenum, and rhenium, especially tungsten hexachloride, molybdenum pentachloride, and rhenium pentachloride. Ordinarily the transition metal salt is employed in an amount such as to provide about 0.0002–0.01, preferably about 0.0003–0.0004, mol of transition metal per mol of copolymer being treated.

The organometallic component of the catalyst system may be one or more organometallic compounds of metals of Groups I-A, II-A, II-B, and III-A of the Periodic Table of Elements. [The Periodic Table to which reference is made is Deming's Periodic Table, which may be found in Lange, "Handbook of Chemistry," Ninth Edition, McGraw-Hill Book Company, Inc. (New York- Toronto-London), 1956, pages 56–57.] When the metal of the organometallic compound is multivalent, any valence not satisfied by an organic group may be satisfied by hydrogen, chlorine, bromine, iodine, or fluorine. The organic groups in these compounds are preferably alkyl groups containing 1–10 carbon atoms or aryl groups such as phenyl, tolyl, or naphthyl.

Exemplary of the organometallic compounds are methyl lithium, butyl lithiums, phenyl lithium, naphthyl lithiums, ethyl sodium, propyl potassiums, butyl rubidiums, pentyl cesiums, octyl beryllium chlorides, dimethyl magnesium, methyl magnesium bromide, diethyl calcium, ethyl calcium iodide, dipentyl strontiums, naphthyl strontium fluorides, dipropyl bariums, phenyl barium chloride, dihexyl zincs, ethyl zinc chloride, dioctyl cadmiums, butyl cadmium chlorides, trimethyl borine, phenyl boron dibromide, pentyl gallium bromides, hexyl indium chlorides, heptyl thallium chlorides, trimethyl aluminum, triethyl aluminum, tripropyl aluminums, tributyl aluminums, tripentyl aluminums, trihexyl aluminums, triheptyl aluminums, trioctyl aluminums, trinonyl aluminums, tridecyl aluminums, triphenyl aluminum, trinaphthyl aluminums, tritolyl aluminums, trimethylnaphthyl aluminums, the corresponding hydrocarbyl aluminum hydrides and dihydrides, and the corresponding hydrocarbyl aluminum chlorides, dichlorides, bromides, dibromides, iodides, diodides, fluorides, and difluorides, etc.

Preferably the organometallic compound is an aluminum compound, more preferably an alkyl aluminum halide, most preferably ethyl aluminum dichloride. The organometallic compound is usually employed in an amount such as to provide an organometallic compound/transition metal salt mol ratio of about 0.5–15, preferably about 0.75–5, most preferably about four.

The proton donor may be one or more compounds selected from glycol and compounds corresponding to the formula ROH wherein R is hydrogen, alkyl, aryl, alkaryl, or aralkyl, and wherein any alkyl group contains up to five carbon atoms and any aryl group is phenyl or naphthyl. Exemplary of such compounds are water, ethylene glycol, propylene glycol, butylene glycol, pentylene glycol, methanol, ethanol, propanol, isopropanol, butanol-1, butanol-2, t-butanol, the pentanols, phenol, alpha- and beta-naphthols, cresols, xylenols, benzyl alcohol, etc. Preferably the proton donor is an alkanol containing 1–5 carbon atoms, especially ethanol. The proton donor is usually employed in an amount such as to provide a proton donor/transition metal salt mol ratio of about 1–6, preferably about 1–3, most preferably about one.

The alkene may be one or more gaseous alkenes, such as ethylene, propylene, butene-1, butene-2, the pentenes, the hexenes, the heptenes, the octenes, the nonenes, the decenes, etc. The normally gaseous alkenes, i.e. those containing 2–4 carbon atoms, are preferred. Usually the alkene is employed in an amount such as to provide an alkene/transition metal salt ratio of at least about one, preferably about 1–6. When required to fill the vapor space in the reaction vessel, more than 6 molar proportions of alkene may be desirably employed, but there does not appear to be any other advantage to be derived from the use of an excess of alkene.

The manner in which the butyl-type rubber is contacted with the catalyst composition is not critical. If desired, the catalyst components may be mixed together and allowed to react with one another before being added to the reaction mixture. However, it is usually preferable to form the catalyst in situ by adding the catalyst components separately to a reaction mixture containing the polymer to be treated. A particularly desirable method is to mix the proton donor with a solution of the transition metal salt in an aromatic hydrocarbon solvent such as benzene, toluene, xylene, etc., add the resultant solution to the polymer in a reaction vessel which has been purged with the alkene, and then add the organometallic compound.

The reaction temperature is preferably maintained in the range of about 20–60° C., about 25° C. being particularly convenient and satisfactory. Lower temperatures may be used but are less desirable because of the slower reaction rates at such temperatures. Temperatures higher than 60° C. are usually undesirable because they may cause excessive molecular sizing. The reaction may be conducted at atmospheric, subatmospheric, or superatmospheric pressure. When the alkene of the catalyst composition is not normally gaseous, subatmospheric pressures sufficient to render it gaseous should be employed.

Ordinarily the butyl-type copolymer is maintained in contact with the catalyst composition for about 30 seconds to about five hours. Longer contact times are usually undesirable because of the excessive degree of molecular sizing which may be obtained when the contact time exceeds about five hours. When the temperature is maintained at about 20–60° C., contact times in the range of about 30 seconds to about two hours, especially about one hour, have been found to be particularly satisfactory.

The molecular sizing reaction is conducted in the substantial absence of catalyst poisons such as oxygen and carbon dioxide, suitably in an alkene atmosphere. To facilitate temperature control it is usually desirable to conduct the reaction in an inert diluent, e.g., a liquid saturated aliphatic hydrocarbon such as n-hexane, isooctane, cyclohexane, etc.

When the desired degree of molecular sizing is attained, the reaction may be terminated by any conventional technique, e.g., by the addition of an excess of water, methanol, or isopropanol. The product may then be recovered by any conventional technique.

The products of the molecular sizing processes have lower molecular weights than the butyl-type copolymer starting materials and vary in consistency from liquids to solids, depending on the degree of molecular sizing. They have narrow molecular weight distributions characterized by $M_w/M_n$ ratios of less than 4, frequently about 2–3. Products of particular interest are those having viscosity average molecular weights of about 50,000–200,000. Such products are useful in sealants, coatings, electrical encapsulants, blends, and binders; and they may be chlorinated to prepare low molecular weight chlorobutyl-type copolymers.

The following examples are given to illustrate the invention and are not intended as a limitation thereof. Unless otherwise specified, quantities mentioned are quantities by weight.

EXAMPLE I

Prepare solution A by dissolving 60 parts of an isobutylene-isoprene copolymer having a combined isoprene content of about 1.6 mol percent, a viscosity average molecular weight of about 430,000, a weight average molecular weight of about 347,000, and a number average molecular weight of about 166,000 in 400 parts of dry cyclohexane.

Prepare solution B by intimately mixing 0.058 part (1.26 molar proportions) of ethanol with a solution of 0.5 part (1.26 molar proportions) of tungsten hexachloride in 35 parts of anhydrous benzene.

Prepare solution C by dissolving 0.064 part (5.04 molar proportions) of ethyl aluminum dichloride in hexane to form a 20% solution.

Purge a suitable reaction vessel with ethylene and charge it with the copolymer solution while maintaining an ethylene pressure of 50 p.s.i. (5.56 molar proportions). Heat the solution to 25° C. and stir. To the stirred solution add solution B and then solution C. One hour after the addition of solution C, add methanol to hydrolyze the catalyst. Isolate the reaction product by precipitation from a large excess of isopropanol, redissolve it in benzene, and recover it by vacuum stripping of the solvent.

The process results in a quantiative yield of a sized copolymer having a weight average molecular weight of 73,920, a number average molecular weight of 28,640, and an $M_w/M_n$ of 2.6.

EXAMPLE II

Repeat Example I except as follows:
(1) Prepare solution B by intimately mixing 0.063 part (1.37 molar proportions) of ethanol with 0.5 part (1.37 molar proportions) of rhenium pentachloride in 35 parts of anhydrous benzene.
(2) Prepare solution C by dissolving 0.069 part (5.48 molar proportions) of ethyl aluminum dichloride in hexane to form a 20% solution.
Similar results are observed.

EXAMPLE III

Prepare solution A by dissolving 60 parts of an isobutylene-isoprene copolymer having a combined isoprene content of about 2.6 mol percent, a viscosity average molecular weight of about 340,000, a weight average molecular weight of about 379,000, and a number average molecular weight of about 199,000 in 400 parts of dry cyclohexane.

Prepare solution B by intimately mixing 0.11 part (1.83 molar proportions) of propanol with a solution of 0.5 part (1.83 molar proportion) of molybdenum pentachloride in 35 parts of anhydrous benzene.

Prepare solution C by dissolving 0.093 part (7.32 molar proportions) of ethyl aluminum dichloride in hexane to form a 20% solution.

Purge a suitable reaction vessel with ethylene and charge it with the copolymer solution while maintaining an ethylene pressure of 50 p.s.i. (5.56 molar proportions). Heat the solution to 25° C. and stir. To the stirred solution add solution B and then solution C. One hour after the addition of solution C, add methanol to hydrolyze the catalyst. Isolate the reaction product by precipitation from a large excess of isopropanol, redissolve it in benzene, and recover it by vacuum stripping of the solvent.

The process results in a quantitative yield of a sized copolymer having a weight average molecular weight of 55,440, a number average molecular weight of 20,330, and an $M_w/M_n$ of 2.7.

EXAMPLE IV

Repeat Example III except for substituting isopropanol for propanol in the preparation of solution B. The sized copolymer has a weight average molecular weight of 28,180, a number average molecular weight of 14,780, and an $M_w/M_n$ of 1.9.

EXAMPLE V

Repeat Example III except for substituting 0.136 part (1.83 molar proportions) of t-butanol for the propanol in the preparation of solution B. The sized copolymer has a weight average molecular weight of 37,880, a number average molecular weight of 17,100, and an $M_w/M_n$ of 2.2.

EXAMPLE VI

Repeat Example V except for conducting the reaction at 60° C. for 30 minutes. The sized copolymer has a weight average molecular weight of 30,950, a number average molecular weight of 14,320, and an $M_w/M_n$ of 2.2.

EXAMPLE VII

Repeat Example III expect for substituting 0.172 part (1.83 molar proportions) of phenol for the propanol in the preparation of solution B. The sized copolymer has a weight average molecular weight of 43,430, a number average molecular weight of 18,710, and an $M_w/M_n$ of 2.1.

EXAMPLE VIII

Repeat Example III except for substituting 0.114 part (1.83 molar proportions) of ethylene glycol for the propanol in the preparation of solution B. The sized copolymer has a weight average molecular weight of 55,440, a number average molecular weight of 26,330, and an $M_w/M_n$ of 2.1.

EXAMPLE IX

Repeat Example III except for substituting 0.084 part (1.83 molar proportions) of ethanol for the propanol in the preparation of solution B and substituting propylene for ethylene. The sized copolymer has a weight average molecular weight 64,080, a number average molecular weight of 29,750, and an $M_w/M_n$ of 2.2.

EXAMPLE X

Repeat Example IX except for substituting butene-2 for the propylene. Similar results are observed.

EXAMPLE XI

Part A

Mill an intimate mixture of 4 parts of dicumyl peroxide and 100 parts of an isobutylene-isoprene copolymer having a combined isoprene content of about one mol percent, a viscosity average molecular weight of about 370,000, a weight average molecular weight of about 333,000, and a number average molecular weight of about 152,000 on a 3000 F. mill. The product is a copolymer having a weight average molecular weight of 295,680, a number average molecular weight of 83,160, and an $M_w/M_n$ of 3.6.

Part B

Prepare soution A by dissolving 60 parts of the product of Part A in 400 parts of dry cyclohexane.

Prepare solution B by intimately mixing 0.084 part (1.83 molar proportions) of ethanol with a solution of 0.5 part (1.83 molar proportions) of molybdenum pentachloride in 35 parts of anhydrous benzene.

Prepare solution C by dissolving 0.093 part (7.32 molar proportions) of ethyl aluminum dichloride in hexane to form a 20% solution.

Purge a suitable reaction vessel with ethylene and charge it with the copolymer solution while maintaining an ethylene pressure of 50 p.s.i. (5.56 molar portions). Heat the solution to 25 C. and stir. To the stirred solution add solution B and then solution C. One hour after the addition of solution C, add methanol to hydrolyze the catalyst. Isolate the reaction product by precipitation from a large excess of isopropanol, redissolve it in benzene, and recover it by vacuum stripping of the solvent.

The process results in a quantitative yield of a sized copolymer having a weight average molecular weight of 69,300, a number average molecular weight of 30,030, and an $M_w/M_n$ of 2..3

Similar results are observed when the materials specified in the foregoing examples are replaced by other materials taught in the specification to be equivalents thereof.

It is obvious that many variations can be made in the products and processes set forth above without departing from the spirit and scope of this invention.

What is claimed is:

1. In a molecular sizing process for preparing a low molecular weight isobutylene-conjugated polyene copolymer by contacting a reaction mixture consisting essentially of a higher molecular weight isobutylene-conjugated polyene copolymer having a combined polyene content of about 1–5 mol percent with a catalyst composition comprising one molar proportion of a transition metal salt, about 0.5–15 molar proportions of an organometallic compound of a metal of Group I–A, II–A, II–B, or III–A of the Periodic Table, and about 1–6 molar proportions of a proton donor selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl, the improvement which comprises narrowing the molecular weight distribution of the product by including as a catalyst component at least about one molar proportion of a gaseous alkene hydrocarbon.

2. The process of claim 1 wherein the copolymer is contacted with the actalyst composition for about 30 seconds to about five hours at a temperature in the range of about 20–60° C.

3. The process of claim 2 wherein the copolymer is contacted with the catalyst composition for about one hour at about 25° C.

4. The process of claim 1 wherein the higher molecular weight copolymer is a rubbery copolymer having a viscosity average molecular weight of about 300,000–500,000.

5. The process of claim 1 wherein the conjugated polyene is an aliphatic conjugated diene containing 4–6 carbon atoms.

6. The process of claim 5 wherein the conjugated diene is isoprene.

7. The process of claim 5 wherein the conjugated diene is butadiene.

8. The process of claim 1 wherein the catalyst composition consists essentially of one molar proportion of the transition metal salt, about 0.75–5 molar proportions of the organometallic compound, about 1–3 molar proportions of the proton donor, and about 1–6 molar proportions of the alkene.

9. The process of claim 8 wherein the catalyst composition consists essentially of one molar proportion of the transition metal salt, about four molar proportions of the organometallic compound, about one molar proportion of the proton donor, and about 1–6 molar proportions of the alkene.

10. The process of claim 1 wherein the transition metal salt is a halide of tungsten, molybdenum, or rhenium.

11. The process of claim 10 wherein the transition metal salt is tungsten hexachloride.

12. The process of claim 10 wherein the transition metal salt is molybdenum pentachloride.

13. The process of claim 1 wherein the organometallic compound is an aluminum compound.

14. The process of claim 13 wherein the aluminum compound is an alkyl aluminum halide.

15. The process of claim 14 wherein the alkyl aluminum halide is ethyl aluminum halide.

16. The process of claim 1 wherein the proton donor is an alkanol containing 1–5 carbon atoms.

17. The process of claim 16 wherein the alkanol is ethanol.

18. The process of claim 1 wherein the alkene contains 2–4 carbon atoms.

19. The process of claim 18 wherein the alkene is ethylene.

20. The process of claim 18 wherein the alkene is propylene.

21. The process of claim 18 wherein the alkene is a butene.

22. In a molecular sizing process for preparing a low molecular weight isobutylene-isoprene copolymer by contacting a reaction mixture consisting essentially of a higher molecular weight isobutylene-isoprene copolymer having a combined isoprene content of about 1–3 mol percent and a viscosity average molecular weight of about 300,000–500,000 with a catalyst composition comprising one molar proportion of a halide of tungsten, molybdenum, or rhenium, about 0.75–5 molar proportions of an alkyl aluminum halide, and about 1–3 molar proportions of an alkanol containing 1–5 carbon atoms and maintaining the copolymer in contact with the catalyst composition for about one hour at about 25° C., the improvement which comprises narrowing the molecular weight distribution of the product by including as a catalyst component about 1–6 molar proportions of a gaseous alkene hydrocarbon containing 2–4 carbon atoms.

23. The process of claim 22 wherein the catalyst composition consists essentially of one molar proportion of tungsten hexachloride, about four molar proportions of ethyl aluminum dichloride, about one molar proportion of ethanol, and about 1–6 molar proportions of the alkene.

24. The process of claim 22 wherein the catalyst composition consists essentially of one molar proportion of molybdenum pentachloride, about four molar proportions of ethyl aluminum dichloride, about one molar proportion of ethanol, and about 1–6 molar proportions of the alkene.

References Cited
UNITED STATES PATENTS

| | | | |
|---|---|---|---|
| 3,029,231 | 4/1962 | Amerongen | 260—87.5 |
| 3,211,710 | 10/1965 | Hendriks et al. | 260—85.3 |
| 3,326,872 | 6/1967 | Weber et al. | 260—88.2 |
| 3,440,237 | 4/1969 | Mottus | 260—94.9 |
| 3,562,804 | 2/1971 | Powers | 260—85.3 |

JAMES A. SEIDLECK, Primary Examiner

A. HOLLER, Assistant Examiner

U.S. Cl. X.R.

260—88.2 S

PO-1050
(5/69)

UNITED STATES PATENT OFFICE
CERTIFICATE OF CORRECTION

Patent No. 3721660           Dated     March 20, 1973

Inventor(s)   Jerome Robert Olechowski

It is certified that error appears in the above-identified patent and that said Letters Patent are hereby corrected as shown below:

Column 6, line 24, "3000 F." should read - - 300° F. - -.

Signed and sealed this 20th day of November 1973.

(SEAL)
Attest:

EDWARD M. FLETCHER, JR.           RENE D. TEGTMEYER
Attesting Officer                 Acting Commissioner of Patents